(No Model.) 2 Sheets—Sheet 1.

J. E. HEWES.
ELECTRIC FURNACE.

No. 572,636. Patented Dec. 8, 1896.

Witnesses. Inventor.
Henry Drury James E. Hewes
Wm L Evans By [signature]
Attorney.

(No Model.)　　　　　　J. E. HEWES.　　　　2 Sheets—Sheet 2.
ELECTRIC FURNACE.

No. 572,636.　　　　　　　　Patented Dec. 8, 1896.

Witnesses　　　　　　　　　　　　Inventor.
R. M. Kelly,　　　　　　　　　James E. Hewes

UNITED STATES PATENT OFFICE.

JAMES ELLICOTT HEWES, OF PHILADELPHIA, PENNSYLVANIA.

ELECTRIC FURNACE.

SPECIFICATION forming part of Letters Patent No. 572,636, dated December 8, 1896.

Application filed September 8, 1896. Serial No. 605,061. (No model.)

*To all whom it may concern:*

Be it known that I, JAMES ELLICOTT HEWES, of the city and county of Philadelphia and State of Pennsylvania, have invented an Improvement in Electric Furnaces, of which the following is a specification.

My invention has reference to electric furnaces; and it consists of certain improvements which are fully set forth in the following specification and shown in the accompanying drawings, which form a part thereof.

My invention has particular use in the manufacture of calcium carbid and comprehends certain specific features of construction designed to secure a more economical handling of the materials to be smelted and a final separation of the carbid from the dust and fine refuse escaping from the furnace-hearth.

In carrying out my invention I provide the furnace with an inclined hearth, parallel to which the positive electrode or anode is moved by suitable devices, preferably automatically controlled. Directly above the lowermost portion of this inclined hearth I arrange the feeding-hopper for charging the furnace with the mixture of calcium and carbon or other material to be smelted. Arranged at an angle to the hearth and at its lowest part I employ a metal door, which acts as the cathode or negative electrode. At the upper part of the furnace and substantially above the door is the chimney or escape-flue to carry off the gases and products of combustion and thereby prevent their destructive action upon the movable electrode or cathode. The furnace below the door is inclosed and receives the contents of the furnace—carbid, ash, slag, and unfused calcium and carbon—the dust being drawn off by suitable suction and the carbid screened and separated from the refuse, &c.

My invention will be better understood by reference to the accompanying drawings, in which—

Figure 1:
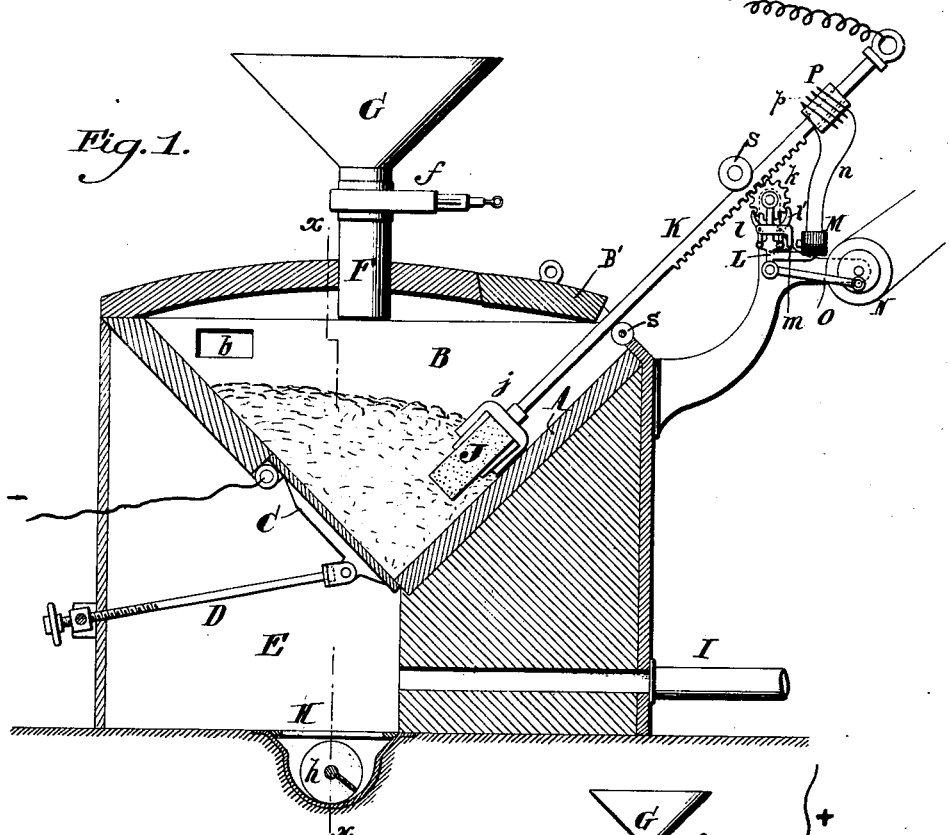
Figures 2, 3:
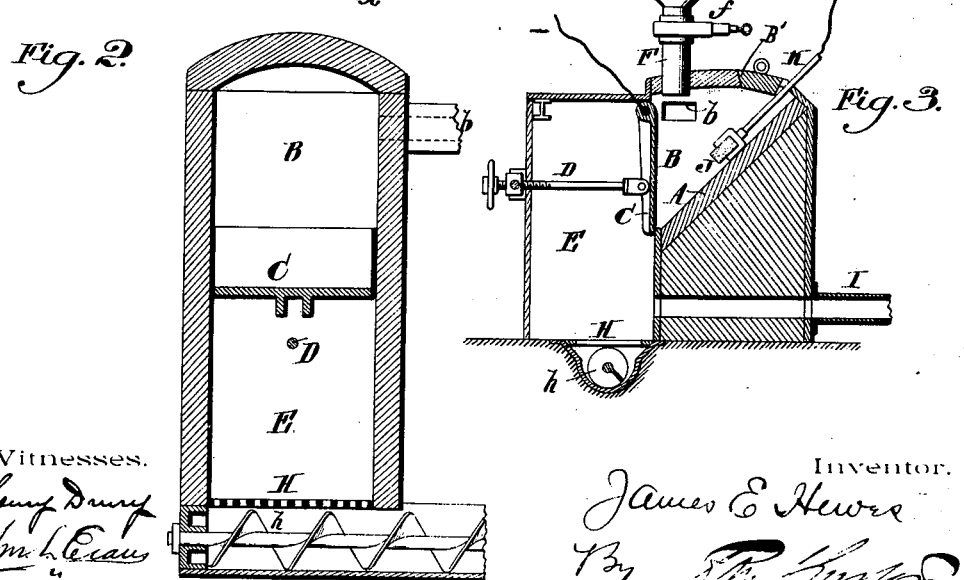
Figure 4:
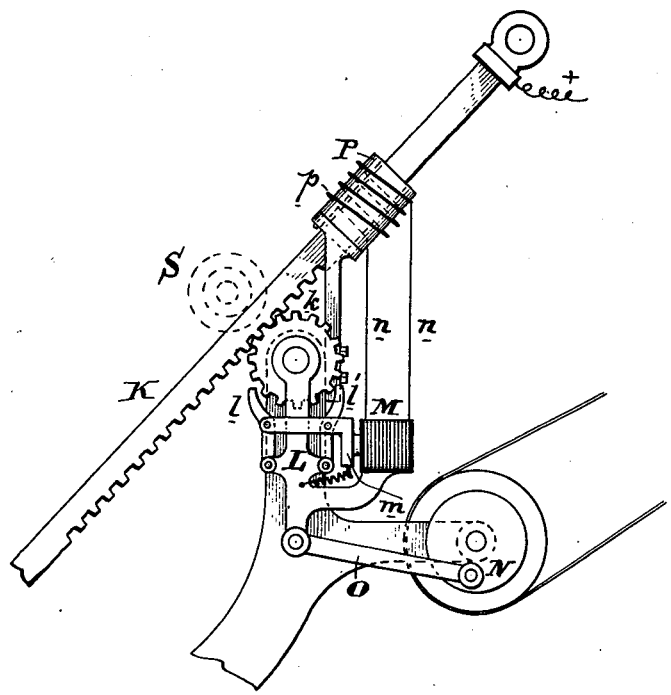

Figure 1 is a sectional elevation of an electric furnace embodying my improvements. Fig. 2 is a cross-section of same on line *x x*. Fig. 3 is a sectional elevation of a modification of my invention, and Fig. 4 is an enlarged elevation of the anode feeding devices.

A is an inclined hearth of fire-brick or refractory material. C is a hinged door of metal arranged at an angle to the said hearth, so as to form an angular pocket at the bottom of the furnace-chamber B. In Fig. 1 the door C is arranged at an angle of forty-five degrees to the vertical, while in Fig. 3 it is arranged vertical; but in both cases the door meets the hearth at an angle. The space E below the door C is inclosed and the door is operated by a screw-rod D or other suitable device extending to the outside of the furnace. The chamber E has a suction or draft flue I opening from it for carrying off the dust and fine particles of matter set free when the contents of the furnace-chamber B are dumped into chamber E. At the floor of the chamber E is a grating H, below which is a conveyer or feed-screw *h* for conveying the materials which pass below the grate away to a suitable dump. The delivery from the flue I and conveyer *h* may be had to the same place.

The upper part of the furnace is provided with a hopper G, having a delivery-chute opening into the furnace-chamber B immediately above the juncture of the door C and hearth A, so as to deliver the materials to be smelted in approximately the right position to be acted upon by the electrodes. The hopper G is provided with a valve *f* for closing the chute F and also for controlling the delivery of the materials into the furnace. The furnace-chamber B is also provided with a chimney-flue *b*, arranged to open from the chamber adjacent to the hinged door or from part of chamber B farthest removed from the electrode J.

J is the anode, and may consist of a large block of carbon. It is held in a holder *j* on the bottom of the feed-rod K. This feed-rod is guided by suitable rollers S, so as to feed the electrode obliquely downward and parallel to the hearth A. Broadly considered, it is immaterial how this electrode is fed, but I have shown a suitable means for controlling the feeding of the electrode automatically. The rod K is provided with a rack with which a pinion *k* meshes. This pinion is turned in either direction by pawls *l l'* under the action of an oscillating frame L and an electromagnet M. The frame L is continuously reciprocated or oscillated by a crank N and pitn O. Normally the pawl l' would be in
ion by a spring with a tendency to lower
electrode. If the current is too strong,
magnet M causes the other pawl l to come
o action, and thereby raises the electrode.
is operation is going on continuously, and
is a normal action is secured with a com-
sating operation for the consumption of
electrode. The magnet M is energized by
ircuit n, leading from a coil p around an
n core P, through which the rod K moves.
om this it will be understood that as an al-
nating current is sent over the rod K to
electrode J it induces in the coil p an in-
ed current of the proper potential and
is energizes the magnet M. It is also evi-
it that variation in the strength of the
in current will produce corresponding va-
tion in the induced current and consequent
ion of the magnet M. It is to be under-
od that I do not limit myself to any par-
ilar means for controlling the movement
the electrode. The source of current is
shown, but it connects by suitable con-
tors with the rod K and the door C, the
rent passing between the door C and elec-
le J and through the materials to be
elted. During the smelting operation the
es are drawn off by the chimney-flue b and
thus led away from the electrode J and
holder j, thereby guarding against injury
these parts or abnormal consumption of
electrode J from overheat.
door or lid B' in the roof of the furnace
y be employed for inserting or removing
anode.
n the operation of the furnace the elec-
le J is gradually raised as the carbid is
ned, and the angle between the said car-
and electrode permits the material to be
lted freely passing down into the right
ition to come under the influence of the
tric current. When the carbid is fully
ned, the current is shut off and the door
ropped, discharging the contents of the
ace into the chamber E, from which the
id may be removed. The arrangement
he chute F above the lower part of the in-
ed hearth A, and preferably above the
cture of the said hearth with the door C,
res the delivery of the materials to be
lted between the cathode and anode and
s reduces the labor in operating the fur-
to a minimum.
place of arranging the door C on an in-
e, as in Fig. 1, it may be arranged verti-
as in Fig. 3. In this case, however, it is
at an angle to the inclined hearth as behe details of construction may be modified
out departing from the essential features
y invention. Hence I do not confine my-
to the details here shown.
hat I claim as new, and desire to secure
etters Patent, is—

In an electric furnace, the combination
furnace-chamber having an inclined
hearth, an electrode movable parallel and
close to said hearth, a normally stationary
electrode arranged at an angle to the lower
part of the hearth, and electric circuits for
supplying current to the movable and station-
ary electrodes.

2. In an electric furnace, the combination
of a furnace-chamber having an inclined
hearth, an electrode movable parallel and
close to said hearth, a normally stationary
electrode arranged at an angle to the lower
part of the hearth, a gas-escape flue or chim-
ney opening from the furnace-chamber to one
side of the movable electrode, and electric
circuits for supplying current to the movable
and stationary electrodes.

3. In an electric furnace, the combination
of a furnace-chamber having an inclined
hearth, an electrode movable parallel and
close to said hearth, a normally stationary
electrode arranged at an angle to the lower
part of the hearth, means to feed the mate-
rials to be smelted into the furnace-chamber
between the electrodes, and electric circuits
for supplying current to the movable and sta-
tionary electrodes.

4. In an electric furnace, the combination
of a furnace-chamber having an inclined
hearth, an electrode movable parallel and
close to said hearth, a normally stationary
electrode arranged at an angle to the lower
part of the hearth, a gas-escape flue or chim-
ney opening from the furnace-chamber to one
side of the movable electrode, means to feed
the materials to be smelted into the furnace-
chamber between the electrodes, and electric
circuits for supplying current to the movable
and stationary electrodes.

5. In an electric furnace, the combination
of a furnace-chamber having an inclined
hearth, an electrode movable parallel and
close to said hearth, a normally stationary
electrode arranged at an angle to the lower
part of the hearth, and means to feed the
movable electrode obliquely relatively to the
stationary electrode.

6. In an electric furnace, the combination
of a furnace-chamber having an inclined
hearth, an electrode movable parallel and
close to said hearth, a normally stationary
electrode arranged at an angle to the lower
part of the hearth, means for locking the sta-
tionary electrode in a closed position, and
electric circuits for supplying current to the
movable and stationary electrodes.

7. In an electric furnace, the combination
of a furnace-chamber having an inclined
hearth, an electrode movable parallel and
close to said hearth, a normally stationary
electrode arranged at an angle to the lower
part of the hearth, means for locking the sta-
tionary electrode in a closed position, a closed
receiving-chamber into which the smelted
materials are received, and electric circuits
for supplying current to the movable and
stationary electrodes.

8. In an electric furnace, the combination of a furnace-chamber having an inclined hearth, an electrode movable parallel and close to said hearth, a normally stationary electrode arranged at an angle to the lower part of the hearth, means for locking the stationary electrode in a closed position, a closed receiving-chamber into which the smelted materials are received, a grate or screen for separating the solid smelted material from the dust, ash, &c., arranged in the lower part of the receiving-chamber, and electric circuits for supplying current to the movable and stationary electrodes.

9. In an electric furnace, the combination of a furnace-chamber having an inclined hearth, an electrode movable parallel and close to said hearth, a normally stationary electrode arranged at an angle to the lower part of the hearth, means for locking the stationary electrode in a closed position, a closed receiving-chamber into which the smelted materials are received, a grate or screen for separating the solid smelted material from the dust, ash, &c., arranged in the lower part of the receiving-chamber, a conveyer below the screen or grate for removing the materials which pass through the grate or screen, and electric circuits for supplying current to the movable and stationary electrodes.

10. In an electric furnace, the combination of a furnace-chamber having an inclined hearth, an electrode movable parallel and close to said hearth, a normally stationary hearth, means for locking the stationary electrode in a closed position, a closed receiving-chamber into which the smelted materials are received, a grate or screen for separating the solid smelted material from the dust, ash, &c., arranged in the lower part of the receiving-chamber, a conveyer below the screen or grate for removing the materials which pass through the grate or screen, an exhaust-flue opening from the receiving-chamber to draw off dust, and electric circuits for supplying current to the movable and stationary electrodes.

11. In an electric furnace, the combination of a furnace-chamber having an inclined hearth, a movable electrode movable parallel and close to the inclined hearth, a hinged electrode arranged at an angle to the lower part of the inclined hearth, means for supplying materials to be smelted to the furnace-chamber arranged above the extreme lower part of the inclined hearth, and a closed receiving-chamber inclosing the hinged electrode and adapted to receive the contents of the furnace-chamber when the hinged electrode is lowered or moved.

12. In an electric furnace, the combination of a furnace-chamber having an inclined hearth, a movable electrode movable parallel and close to the inclined hearth, a hinged electrode arranged at an angle to the lower part of the inclined hearth, means for supplying materials to be smelted to the furnace-chamber arranged above the extreme lower part of the inclined hearth, a closed receiving-chamber inclosing the hinged electrode and adapted to receive the contents of the furnace-chamber when the hinged electrode is lowered or moved, and an exhaust-flue opening from the receiving-chamber to draw off the dust therefrom.

13. The method of producing calcium carbid which consists in subjecting an excess of lime and carbon over that required to produce the carbid to the action of an electric arc in a closed chamber, then discharging the carbid and associated carbon lime and half-fused substances into a closed chamber, and while in the disturbed condition produced thereby sucking off the fine dust and particles from the solid carbid.

14. The method of producing calcium carbid which consists in subjecting an excess of lime and carbon over that required to produce the carbid to the action of an electric arc in a closed chamber, then discharging the carbid and associated carbon lime and half-fused substances into a closed chamber, and while in the disturbed condition produced thereby sucking off the fine dust and particles from the solid carbid, then screening the associated matters from the solid carbid, and finally removing the cleansed carbid from the closed chamber.

15. In an electric furnace the combination of an electrode, a conductor through which the current is fed to the electrode, an iron tube encircling the conductor, a coil around the iron tube, a rotary feeding device for the electrode, ratchet-and-pawl devices for operating the rotary feeding devices, power devices for operating the pawls, and electromagnetic devices under the control of the current in the coil for throwing the pawls into or out of action.

In testimony of which invention I have hereunto set my hand.

JAMES ELLICOTT HEWES.

Witnesses:
R. M. KELLY,
J. J. BOYLE.